United States Patent
Ekbäck et al.

(10) Patent No.: US 11,217,387 B2
(45) Date of Patent: Jan. 4, 2022

(54) DEVICE FOR A WIRELESS POWER TRANSFER SYSTEM FOR A VEHICLE

(71) Applicant: Ningbo Geely Automobile Research & Development Co., Ltd., Ningbo (CN)

(72) Inventors: Johan Ekbäck, Torslanda (SE); Gabriel Samuelsson, Alingsås (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 45 days.

(21) Appl. No.: 16/742,347

(22) Filed: Jan. 14, 2020

(65) Prior Publication Data
US 2020/0148067 A1    May 14, 2020

Related U.S. Application Data

(63) Continuation of application No. PCT/CN2018/088708, filed on May 28, 2018.

(30) Foreign Application Priority Data

Aug. 2, 2017 (EP) ..................................... 17184533

(51) Int. Cl.
*H01F 38/14* (2006.01)
*H02J 50/10* (2016.01)
(Continued)

(52) U.S. Cl.
CPC .............. *H01F 38/14* (2013.01); *B60L 53/12* (2019.02); *H01F 27/2871* (2013.01);
(Continued)

(58) Field of Classification Search
CPC ........ H02J 50/10–12; B60L 53/12–126; H01F 38/14; H01F 27/027; H01F 27/28–306; H01F 2027/065
See application file for complete search history.

(56) References Cited

U.S. PATENT DOCUMENTS

2008/0197960 A1* 8/2008 Hasegawa ............. H01F 27/292
                                                                   336/110
2012/0049991 A1* 3/2012 Baarman ................. H02J 50/12
                                                                   336/199
(Continued)

FOREIGN PATENT DOCUMENTS

CN        105337336 A    2/2016
CN        106205986 A   12/2016
(Continued)

OTHER PUBLICATIONS

"Bifilar coil", Aug. 22, 2017, Wikipedia, retrieved via Wayback machine at <https://web.archive.org/web/20170822041444/https://en.wikipedia.org/wiki/Bifilar_coil> (Year: 2017).*
(Continued)

*Primary Examiner* — Hal Kaplan
*Assistant Examiner* — David A Shiao
(74) *Attorney, Agent, or Firm* — Tucker Ellis LLP (57) ABSTRACT

The invention relates to a device for a wireless power transfer system for a vehicle. The device comprises a coil formed by at least a first conductor wire forming a first sub coil with a plurality of windings and a second conductor wire forming a second sub coil with a plurality of windings. The coil has a first loop and a second loop positioned next to each other. The first and second loop have a central portion of the coil in common where said at least first and second conductor wires extend from the first loop to the second loop and vice versa. The first and second conductor wires are arranged next to each other in the central portion. The first and second conductor wires are arranged above each other in an outer portion of the first loop and in an outer portion of the second loop.

18 Claims, 10 Drawing Sheets

(51) Int. Cl.
    *B60L 53/12*     (2019.01)
    *H01F 27/28*     (2006.01)
    *H02J 50/00*     (2016.01)
    *H02J 50/40*     (2016.01)

(52) U.S. Cl.
    CPC ............ *H02J 50/005* (2020.01); *H02J 50/10* (2016.02); *H01F 27/2823* (2013.01); *H02J 50/402* (2020.01)

(56) References Cited

U.S. PATENT DOCUMENTS

| | | |
|---|---|---|
| 2014/0327391 A1 | 11/2014 | Niederhauser |
| 2015/0130979 A1* | 5/2015 | Huang ................. H04B 5/0081 348/333.01 |
| 2015/0145635 A1* | 5/2015 | Kurz ................... H01F 27/2871 336/232 |
| 2016/0013661 A1 | 1/2016 | Kurs |
| 2016/0031331 A1 | 2/2016 | Altunyurt |
| 2016/0118806 A1* | 4/2016 | Standke ................. H02J 50/40 307/104 |
| 2016/0204618 A1 | 7/2016 | Samuelsson |
| 2017/0129344 A1* | 5/2017 | Islinger ................. B60L 53/126 |
| 2018/0026470 A1* | 1/2018 | Aghassian ............. H02J 7/025 320/108 |
| 2018/0086211 A1* | 3/2018 | Samuelsson ............ B60L 53/30 |
| 2018/0269714 A1* | 9/2018 | Samuelsson ........ H01F 27/2871 |

FOREIGN PATENT DOCUMENTS

| | | |
|---|---|---|
| EP | 3385694 A1 | 10/2018 |
| WO | 2015159466 A1 | 10/2015 |
| WO | 2017078880 A1 | 5/2017 |

OTHER PUBLICATIONS

Extended European Search Report from corresponding European Application No. 17184533.2, dated Feb. 16, 2018, 7 pages.
International Search Report and Written Opinion from corresponding International Application No. PCT/CN2018/088708, dated Sep. 12, 2018, 10 pages.
Office Action (Communication Pursuant to Article 94(3) EPC) from corresponding European Application No. 17184533.2, dated Oct. 1, 2019, 5 pages.

* cited by examiner

DEVICE FOR A WIRELESS POWER TRANSFER SYSTEM FOR A VEHICLE

RELATED APPLICATION DATA

This application is a continuation of International Patent Application No. PCT/CN2018/088708, filed May 28, 2018, which claims the benefit of European Patent Application No. 17184533.2, filed Aug. 2, 2017, the disclosures of which are incorporated herein by reference in their entireties.

TECHNICAL FIELD

The invention relates to a device for a wireless power transfer system for a vehicle, and a receiver and a vehicle comprising such a device.

BACKGROUND

Electric vehicles and plug in hybrid vehicles can be charged wirelessly through induction coils. Usually a first coil of a transmitter is arranged on the floor or the ground under the vehicle and a second coil of a receiver is arranged underneath the vehicle. There is a lot of different coil topologies that can be used for transferring power. In addition to transfer power efficiently, often small sized coils and coils enabling a large positioning tolerance between the transmitter coil and the receiver coil are preferred. This in turn makes the manufacturing and assembling of the coil into a casing relatively complicated. Since the power to be transferred by wireless charging is increasing there are more coils for wireless power transfer systems that are made by two or more sub coils arranged electrically connected in parallel. The use of such multifilar coils makes the production of wireless power transfer system for vehicles even more complex.

SUMMARY

According to a first aspect of the invention, an object of the invention is to provide a device for a wireless power transfer system for a vehicle, which device has a design facilitating the production of multifilar coils enabling higher power to be transferred.

The object is achieved by a device for a wireless power transfer system for a vehicle, wherein the device comprises a coil formed by at least a first conductor wire forming a first sub coil with a plurality of windings and a second conductor wire forming a second sub coil with a plurality of windings, and the coil has a first loop and a second loop positioned next to each other, the first and second loop have a central portion of the coil in common where said at least first and second conductor wires extend from the first loop to the second loop and vice versa, and said at least first and second conductor wires are arranged next to each other in the central portion, and said at least first and second conductor wires are arranged above each other in an outer portion of the first loop and in an outer portion of the second loop, wherein each of said at least first and second conductor wires is twisted around its own longitudinal axis at a position between the central portion and the first loop outer portion and at a position between the central portion and the second loop outer portion, and said at least first and second conductor wires are twisted in the same rotation direction such that a lateral surface of the second conductor wire facing away from the corresponding first conductor wire in the central portion, constitutes a top surface of the second conductor wire in the first loop outer portion and the second loop outer portion, and a lateral surface of the first conductor wire facing away from the corresponding second conductor wire in the central portion, constitutes a bottom surface of the first conductor wire in the first loop outer portion and the second loop outer portion, and the second conductor wire is arranged above the first conductor wire in the first loop outer portion and the second loop outer portion.

Each conductor wire can be twisted about 90 degrees and the cross section of the conductor wire is preferably rectangular.

By providing such a device with twisted conductor wires, two or more conductor wires can be used while the space available for the coil can used more efficiently. This in turn means that an increased number of conductor wire windings can be used allowing more power to be transferred. The production of such a coil can however be very complex.

The invention is based on the insight that if the conductor wires are twisted in a certain way, the sub coils having twisted conductor wires can still be arranged in separate layers on top of each other. Further, the sub coils can be wound separately into holders and thereafter be brought together to form the coil. This will enable each sub coil to be positioned and kept by its holder and facilitate the production of the device since the conductor wires can be wound and twisted one by one.

According to one embodiment, the device comprises a first holder for accommodating and holding the first sub coil and a second holder for accommodating and holding the second sub coil, and the first holder and the second holder are arranged relative to each other such that the first sub coil and the second sub coil together form the coil. Hereby, not only is the formation of the coil facilitated due to the fact that the respective sub coil can be created separately and be kept in position during assembling, but the positions of the sub coils are secured also after assembling of the device. By designing each holder properly for receiving the conductor wire, the coil can be formed by arranging the holders relative to each other in a non-complicated manner. Preferably, the first sub coil is wound into the first holder and the second sub coil is wound into the second holder.

According to a further embodiment of the invention, the coil has a third conductor wire forming a third sub coil with a plurality of windings, wherein the third conductor wire is twisted such that a lateral surface of the third conductor wire facing away from the corresponding second conductor wire in the central portion, constitutes a top surface of the third conductor wire in the first loop outer portion and the second loop outer portion, and the third conductor wire is arranged above the second conductor wire in the first loop outer portion and the second loop outer portion. Due to the way of twisting the conductor wires, the sub coils having twisted conductor wires can still be arranged in separate layers on top of each other, even if the number of sub coils is increased. Hereby, the number of conductor wire windings can be further increased allowing more power to be transferred by the device.

According to a further embodiment of the invention, the device comprises a third holder for accommodating and holding the third sub coil, and the first, second and third holder are arranged relative to each other such that the first, second and third sub coil together form the coil. Preferably, the third sub coil is wound into the third holder. Hereby, advantages that correspond to what has been described with reference to the first and second holder hereinabove are achieved.

The advantages of further embodiments of the first aspect of the invention will be substantially the same as described hereinafter with reference to different embodiments of a second aspect of the invention. It should also be stressed that the features of the example embodiments of the first aspect of the invention can be combined with the features of the example embodiments of the second aspect of the invention.

According to a second aspect of the invention, an object of the invention is to provide a device for a wireless power transfer system for a vehicle, which device has a design improving the performance and/or facilitating the assembly of the device.

The object is achieved by a device for a wireless power transfer system for a vehicle, wherein the device comprises a coil formed by at least a first conductor wire forming a first sub coil with a plurality of windings and a second conductor wire forming a second sub coil with a plurality of windings, wherein the device comprises a circuit card having electric contact points for connecting the ends of said at least first and second conductor wires, electric contacts arranged at a connection position provided for external electrical connection of the coil and circuits extending from the electric contact points to the electric contacts.

By the use of such a circuit card, the conductor wires can be terminated at more favourable positions. Hereby, the conductor wire does not need to be curved with a small radius to reach the connection position for external electric connection of the coil. This will enable conductor wires which cannot be bent with such a small radius to be used. Further, the extension of conductor wires in areas where these in fact are undesired can be minimized, which in turn can increase the magnetic performance of the device and reduce the usage of conductor wires.

According to one embodiment of the second aspect, the coil has a first loop and a second loop, and the electric contact points comprise for each of the conductor wires a contact point for a first end of the conductor wire and a contact point for a second end of the conductor wire, wherein said first end contact point is arranged at the first loop, and said second end contact point is arranged at the second loop. Hereby, even if there is a relatively large distance between the first end and the second end of the conductor wire, the positions where the conductor wire is terminated can be selected taking the magnetic performance of the coil into consideration, while the circuits of the circuit card provides connection from the first end contact point and the second end contact point to the electric contacts at the external electrical connection position of the coil.

According to a further embodiment of the second aspect, the first end contact point is arranged at the inside of the first loop, and the second end contact point is arranged at the inside of the second loop. In this case, the use of a circuit card is favourable due to the fact that the end portions of the conductor wires do not need to extend in another plane and across the windings of the coil, and thereby the thickness of the coil can be reduced. This means for example that when arranging a ferrite plate close to the coil no slot in the ferrite plate is needed for making space for any conductor wire end portions extending to the position for external electrical connection of the coil. This in turn implies that an increased amount of ferrite and a non-complicated ferrite plate shape without chamfered edges can be used.

According to a further embodiment of the second aspect, the connection position is arranged outside of the first loop and the second loop in an area between the first loop and the second loop. Hereby, the size of the device can be minimized since a free area is utilized instead of increasing the size of the device by any protrusion for instance, for providing the external electrical connection of the coil.

According to a further embodiment of the second aspect of the invention, the device has a housing enclosing the coil, the circuit card constituting a part of the housing, and preferably the circuit card constitutes a back plate of the device. Hereby, a conventional back plate of the device can be dispensed with, since it is replaced by the circuit card. Further, the use of the circuit card as a back plate (instead of an additional separate plate), and particularly in combination with the contact points provided by the circuit card, the thickness of the device can be considerably reduced.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
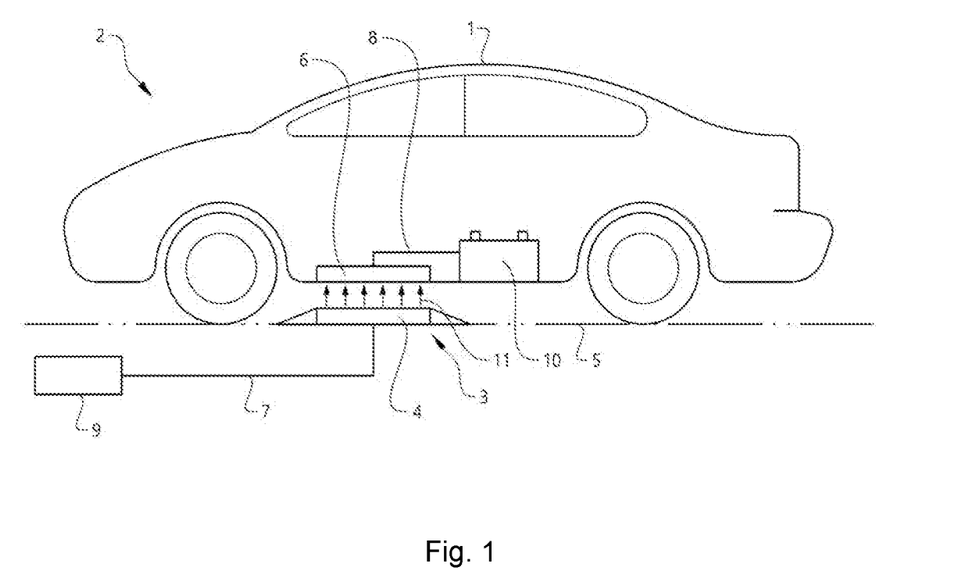
FIG. 1 is a side view of a vehicle and a wireless power transfer system of a charging station.

In FIG. 1 a vehicle 1 is positioned at a charging station 2 where a wireless power transfer system 3 is used. The wireless power transfer system 3 includes a transmitter 4 arranged on the floor 5 and a receiver 6 arranged in the vehicle 1. Such a transmitter can be arranged on or in the floor or the ground. Further, the receiver 6 is preferably arranged on the underside of the vehicle 1. The transmitter 4 has a primary coil for generating an electromagnetic field and the receiver 6 has a secondary coil for interacting with the generated electromagnetic field for achieving power transfer from the primary coil to the secondary coil by electromagnetic induction. A power input 7 to the transmitter 4 can be wirelessly transferred from the transmitter 4 to the receiver 6 to achieve a power output 8 from the receiver 6. The wireless transfer of energy is schematically illustrated with arrows 11.

In the illustrated example, the transmitter 4 is powered by a power source 9 electrically connected to the transmitter 4. The power source and the power outlet thereof can be arranged at any suitable position, for example the power source can be arranged on a wall. The receiver 6 can be connected to any arrangement for storing and/or consumption of the energy transferred. In the illustrated example, the receiver 6 is electrically connected to a battery 10 arranged on the vehicle 1 for charging the battery 10. The vehicle 1 is positioned for arranging the transmitter 4 and the receiver 6 relative to each other such that energy can be transferred from the transmitter 4 to the receiver 6. The transmitter 4 and the receiver 6 are separated by a predetermined distance in the vertical direction. Further, the transmitter 4 and the receiver 6 are at least partly overlapping each other when looked at in the vertical direction.

The device according to the invention can be applied for providing a transmitter and/or a receiver of a wireless power transfer system. For example, such a wireless power transfer system device according to the invention can be used as a component of a receiver to be arranged on a vehicle as illustrated in FIG. 1. It should be stressed that when the device is used as a receiver coil or transmitter coil, the complete receiver or transmitter may include other components as well, such as electric circuits and components. Further, the invention is not in any way limited to the car application. The device can be used in any vehicle or machine application, such as for example cars, busses, trucks, industrial trucks and automated guided vehicles, construction equipment and work machines, and trains.

Figure 2:
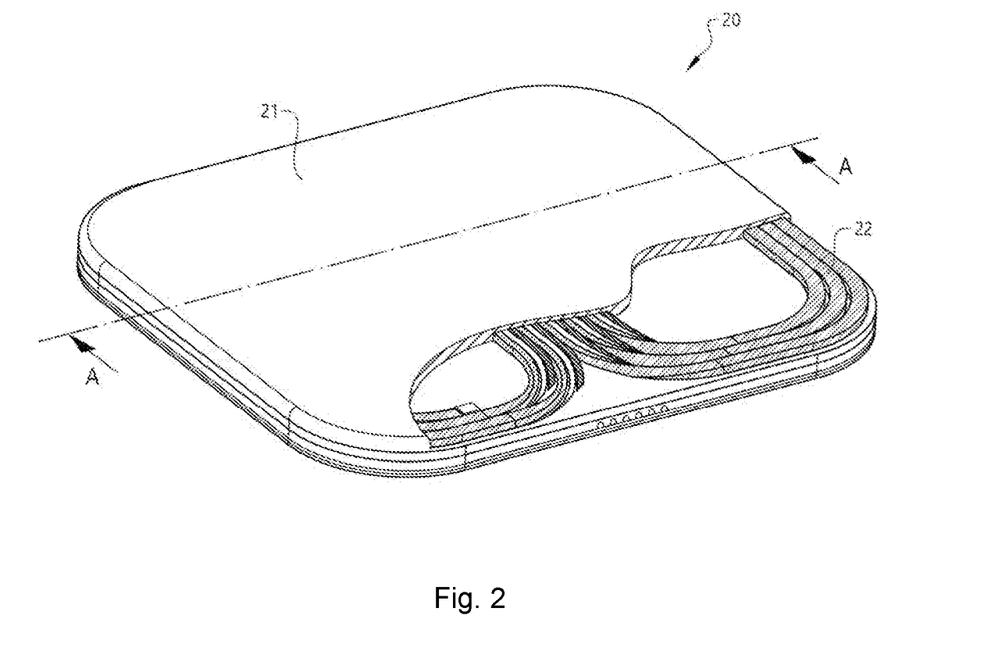
FIG. 2 is a partly cut perspective view of one embodiment of a device according to the invention.

In FIG. 2 a device 20 for a wireless power transfer system is illustrated. The device 20 comprises a housing 21 and a coil 22 arranged inside the housing 21. FIG. 2 is a partly cut perspective view where a part of the housing 21 has been removed for illustrating the coil 22. The coil 22 is formed by at least two sub coils. The sub coils are preferably arranged adjacent to each other. Further, in the example embodiments illustrated herein, the sub coils are arranged to be electrically connected in parallel. Although in the example embodiments illustrated herein, the coil 22 is formed by two or three sub coils, it should be stressed that four or more sub coils can also be used in other applications.

Figure 3A:
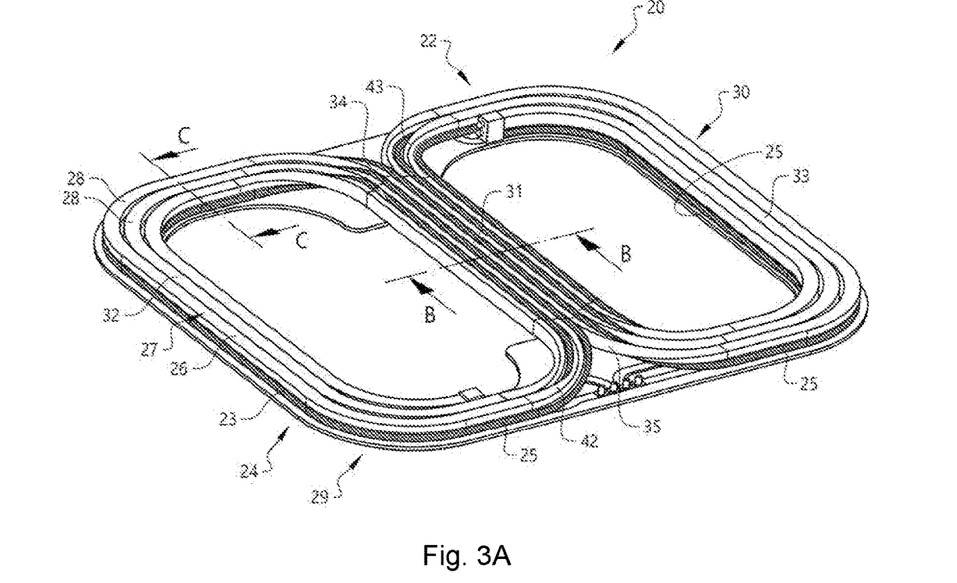
FIG. 3A is a perspective view of a variant of the device in FIG. 2 having two sub coils, depicted without housing for the purpose of illustration.
Figure 4A:
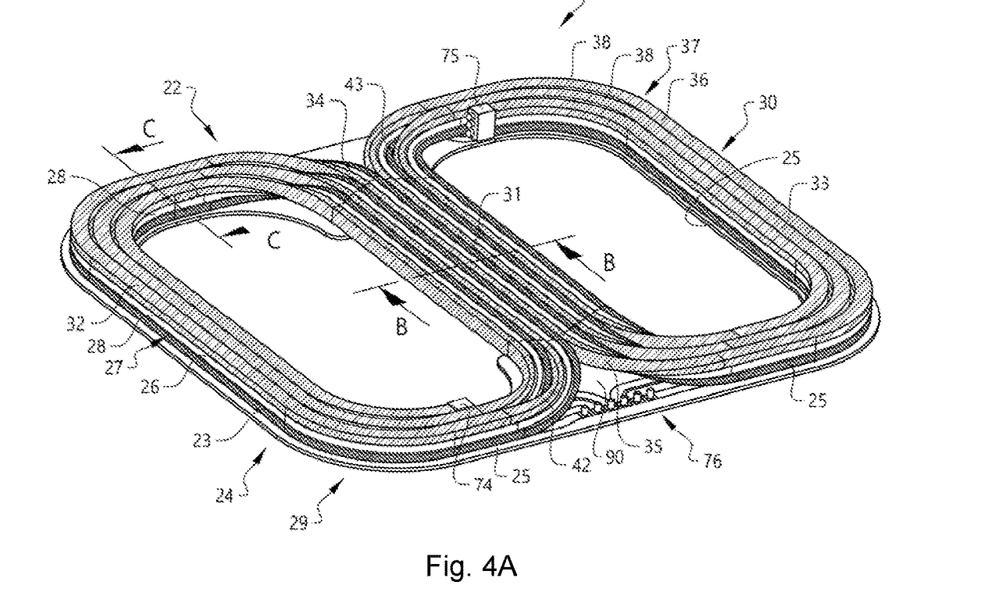
FIG. 4A is a perspective view of the device in FIG. 2 having three sub coils, depicted without housing for the purpose of illustration.

In FIGS. 3A and 4A, two different example embodiments of the device 20 are illustrated. For illustration purposes only, the sub coils without the housing or any ferrite plate are shown in FIGS. 3A and 4A.

In the example embodiment illustrated in FIG. 3A, the coil has two sub coils. The coil 22 comprises a first conductor wire 23 forming a first sub coil 24 with a plurality of windings 25 and a second conductor wire 26 forming a second sub coil 27 with a plurality of windings 28. Further, only for improving the illustration, the first conductor wire 23 is dark grey and the second conductor wire 26 is white.

The conductor wires can be wound into different shapes. As appears from FIGS. 3A and 4A, here the coil 22 has a first loop 29 and a second loop 30 positioned next to each other, where each sub coil 24, 27 has a plurality of windings of the first loop 29 and a plurality of windings of the second loop 30. Although the sub coils of the device illustrated in FIGS. 3A and 4A are wound to form a so called "double D"-configuration having a first "D-loop" 29 and a second "D-loop" 30, also other coil configurations can be used.

The first loop 29 and second loop 30 have a central portion 31 of the coil 22 in common where the first conductor wire 23 and second conductor wire 26 extend from the first loop 29 to the second loop 30 and vice versa. The first and second conductor wires 23, 26 are arranged next to each other in the central portion 31, preferably in one and the same plane. The first conductor wire and the second conductor wire are suitably arranged adjacent to each other.

The first and second conductor wires are arranged above each other in an outer portion 32 of the first loop 29 and in an outer portion 33 of the second loop 30, and preferably the first and second conductor wires are arranged on top of each other.

Each of the conductor wires 23, 26 is twisted around its own longitudinal axis at a position or first twisting zone 34 between the central portion 31 and the first loop outer portion 32 and at a position or second twisting zone 35 between the central portion 31 and the second loop outer portion 33. The first and second conductor wires are twisted in the same rotation direction at the same twisting position. The conductor wires are preferably twisted about 90 degrees.

In the example embodiment illustrated in FIG. 4A, the coil has three sub coils. The coil 22 comprises a first conductor wire 23 forming a first sub coil 24 with a plurality of windings 25, a second conductor wire 26 forming a second sub coil 27 with a plurality of windings 28 and a third conductor wire 36 forming a third sub coil 37 with a plurality of windings 38. Further, only for improving the illustration, the first conductor wire 23 is dark grey, the second conductor wire 27 is white and the third conductor wire 36 is grey. Similar to what has been described with reference to FIG. 3A, in the example embodiment illustrated in FIG. 4A, the first loop 29 and second loop 30 have a central portion 31 of the coil in common where the first, second and third conductor wires 23, 26, 36 extend from the first loop 29 to the second loop 30 and vice versa. The first, second and third conductor wires are arranged next to each other in the central portion 31, preferably in one and the same plane. The first, second and third conductor wire are suitably arranged adjacent to each other.

The first, second and third conductor wire 23, 26, 36 are arranged above each other in an outer portion 32 of the first loop 29 and in an outer portion 33 of the second loop 30, and preferably the first, second and third conductor wire are arranged on top of each other.

Each of the conductor wires 23, 26, 36 is twisted around its own longitudinal axis at a position or first twisting zone 34 between the central portion 31 and the first loop outer portion 32 and at a position or second twisting zone 35 between the central portion 31 and the second loop outer portion 33. The first, second and third conductor wires are twisted in the same rotation direction at the same twisting position. The conductor wires are preferably twisted about 90 degrees.

Figure 3B:
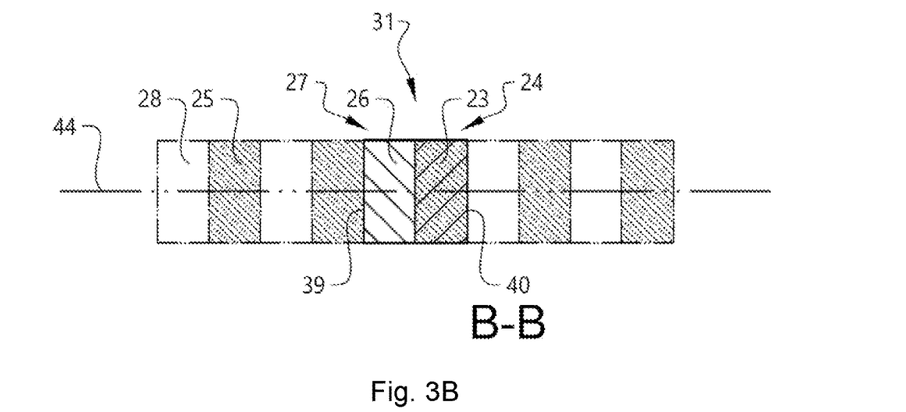
FIG. 3B is a cross-sectional view of the sub coils taken along B-B in FIG. 3A.
Figure 3C:
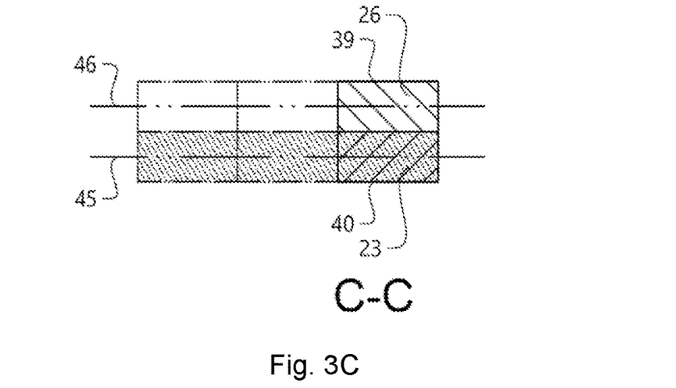
FIG. 3C is a cross-sectional view of the sub coils taken along C-C in FIG. 3A.
Figure 4B:
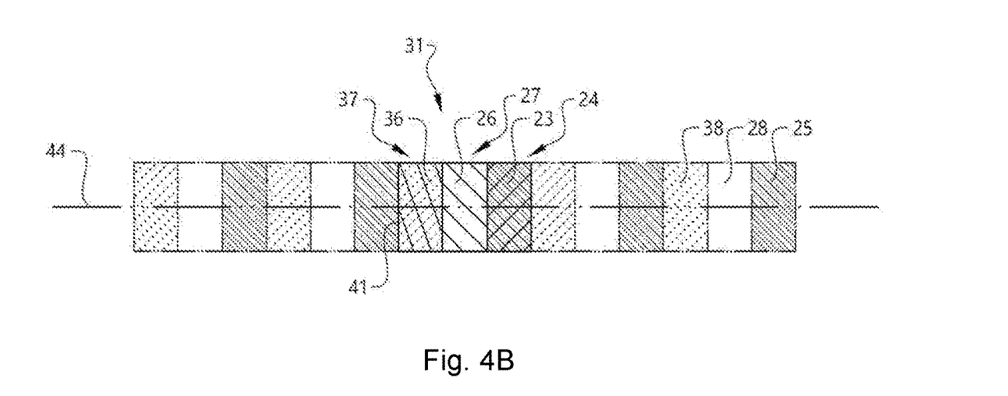
FIG. 4B is a cross-sectional view of the sub coils taken along B-B in FIG. 4A.
Figure 4C:
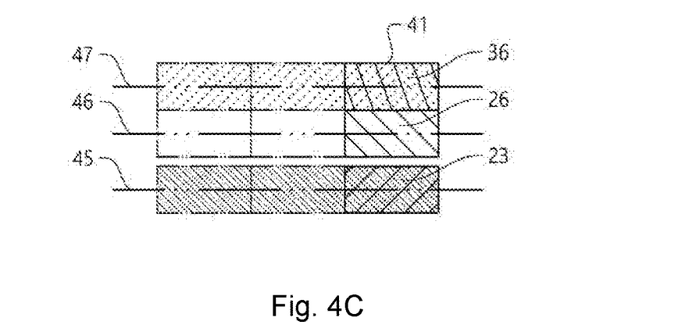
FIG. 4C is a cross-sectional view of the sub coils taken along C-C in FIG. 4A.

The twisting direction is further illustrated in cross section views of FIGS. 3B, 3C, 4B and 4C, where FIGS. 3B and 4B show the conductor wire orientation at the central portion and FIGS. 3C and 4C show the conductor wire orientation at the first loop outer portion (and second loop outer portion).

In FIGS. 3B and 3C the device comprises two sub coils 24, 27 as also illustrated in FIG. 3A. In this embodiment, the first and second conductor wires 23, 26 are twisted in the same rotation direction such that a lateral surface 39 of the second conductor wire 26 facing away from the corresponding first conductor wire 23 in the central portion 31, constitutes a top surface 39 of the second conductor 26 wire in the first loop outer portion 32 and the second loop outer portion 33. Further, a lateral surface 40 of the first conductor wire 23 facing away from the corresponding second conductor wire 26 in the central portion 31, constitutes a bottom surface 40 of the first conductor wire 23 in the first loop outer portion 32 and the second loop outer portion 33. The second conductor wire 26 is arranged above, preferably on top of the first conductor wire 23 in the first loop outer portion 32 and the second loop outer portion 33.

The principle of the twisting is important, which makes it possible to have the sub coils in the same order in the outer portion of the both loops of the coil, i.e. the second conductor wire above the first conductor wire as the device is illustrated. Of course, should the device be turned upside down one could say the first conductor wire would be arranged above the second conductor wire in both loops.

In FIGS. 4B and 4C the device comprises three sub coils 24, 27, 37. The first and second conductor wires 23, 26 are twisted in the same way as described with reference to FIGS. 3B and 3C. The third conductor wire 36 is twisted in the same direction as the first and second conductor wires 23, 26 such that a lateral surface 41 of the third conductor wire 36 facing away from the corresponding second conductor wire 26 in the central portion 31, constitutes a top surface 41 of the third conductor wire 36 in the first loop outer portion 32 and the second loop outer portion 33. Further, the third conductor wire 36 is arranged above and preferably on top of the second conductor wire 26 in the first loop outer portion 32 and the second loop outer portion 33.

This means, for any number of sub coils, that when looking in the direction from the central portion 31 towards the first loop 29, the conductor wires are twisted clockwise at the first twisting zone 34, and when looking in the direction from the central portion 31 towards the second loop 30, the conductor wires are twisted counterclockwise at the second twisting zone 35. By twisted is meant rotated around its own longitudinal axis. The central portion 31 is defined as a portion of the central group of conductor wires extending from the first loop to the second loop and vice versa, i.e. the conductor wire portions involved in the transition between the first and second loop.

In addition to the central portion, also for other windings (shown by dotted lines in FIG. 3B) a further portion of the first sub coil and a further portion of the second sub coil can be arranged next to the central portion 31, preferably in one and the same plane. This is also illustrated in FIG. 3A, where the coil 22 has alternating windings of the first sub coil and windings of the second sub coil 27 in one and the same plane. In other words; for a plurality of windings of the first sub coil 24 and the second sub coil 27, each winding 25 of first sub coil 24 is followed by a winding 28 of the second sub coil 27, and each winding of the second sub coil 27 is followed by a winding 25 of the first sub coil 24.

In a similar way for the embodiment illustrated in FIG. 4A, also for other windings (shown by dotted lines in FIG. 4B) in addition to the central portion 31, a further portion of the first sub coil, the second sub coil and the third sub coil can be arranged next to the central portion, preferably in one and the same plane. Here, each winding 25 of the first sub coil 24 is followed by a winding 28 of the second sub coil 27, and each winding 28 of the second sub coil 27 is followed by a winding 38 of the third sub coil 37.

Further, in the example embodiment illustrated in FIGS. 3B and 3C, the central portion and the windings next to the central portion are arranged in a first plane 44. In the first loop outer portion and the second loop outer portion, the first sub coil is arranged in a second plane 45 and the second sub coil is arranged in a third plane 46 above the second plane 45.

Further, in the example embodiment illustrated in FIGS. 4B and 4C, the central portion and the windings next to the central portion are arranged in a first plane 44. In the first loop outer portion and the second loop outer portion, the first sub coil is arranged in a second plane 45 and the second sub coil is arranged in a third plane 46 above the second plane 45, and the third sub coil is arranged in a fourth plane 47 above the third plane 46.

This means that the conductor wires extend from the central portion to the first loop outer portion and then back to a position close to the central portion, and then to the first loop outer position again, etc. In the same way, the conductor wires extend from the central portion to the second loop outer portion and then back to a position close to the central portion, and then to the second loop outer position again, etc. Therefore, the conductor wires are preferably twisted also in a third twisting zone 42 of the first loop 29 and a fourth twisting zone 43 of the second loop 30.

For the first loop 29, in the first twisting zone 34 all windings are twisted as the conductor wires constituting the central portion being twisted (clockwise) as described hereinabove. In the third twisting zone 42, all windings are twisted counterclockwise.

For the second loop 30, in the second twisting zone 35 all windings are twisted as the connector wires constituting the central portion being twisted (counterclockwise) as described hereinabove. In the fourth twisting zone 43, all windings are twisted clockwise.

Further, the windings of each sub coil are suitably arranged for forming a substantially flat sub coil. Such a flat sub coil has a relatively large extension in a main plane in relation to the thickness of the sub coil. By arranging these sub coils on top of each other, the coil 22 may have a thickness corresponding to the sum of the individual thicknesses of the sub coils.

The portions of the sub coils that are arranged in one and the same plane can be positioned in an inner central part of the device, whereas the first loop outer portion and second loop outer portion where the sub coils are arranged on top of each other can be positioned in the outer parts of the device, along a perimeter of the device for instance.

The number of windings of each sub coil can be varied depending on the application and the dimension of the conductor wire used. For example, the number of windings can be in the interval 2-15, and often preferably in the interval 3-8, for each of the sub coils. The number of windings is preferably approximately the same for all sub coils. The path of each conductor wire is preferably similar for the conductor wires. In other words; the sub coils have suitably similar configurations for giving the coil 22 the desired shape and/or electromagnetic properties.

The conductor wire of the sub coils can be made from any suitable conducting material, preferably metal, such as for example copper. The conductor wire should have a cross section area adapted to the electric current to be transferred.

For many applications where the device is used for a wireless power transfer system in a vehicle application, the cross-section area of the wire can be in the interval 4-100 mm$^2$, and often in the interval 8-80 mm$^2$. The cross section of the conductor wire is preferably square, such as four-square or rectangular. The cross-section dimensions of the conductor wire can be in the interval 2-10 mm, for instance. Often a so called litz wire can be used. Such a conductor wire is the sum of many small strands of individually insulated copper wires. In this case, the cross-section area of the conductor wire is the sum of the cross-section areas of the strands.

The cross section of the conductor wire is suitably rectangular. In such a case, the conductor wire is preferably arranged endwise in the central portion, i.e. the largest side of the cross section has a direction perpendicular to the plane of conductor wires in the central portion, whereas shortest side has a direction in parallel with the plane. In the first loop and second loop outer portions, where the conductor wires are arranged on top of each other, the largest side of the cross section has a direction in parallel with the respective sub coil plane, whereas the shortest side of the cross section has a direction perpendicular the plane.

Figure 5:
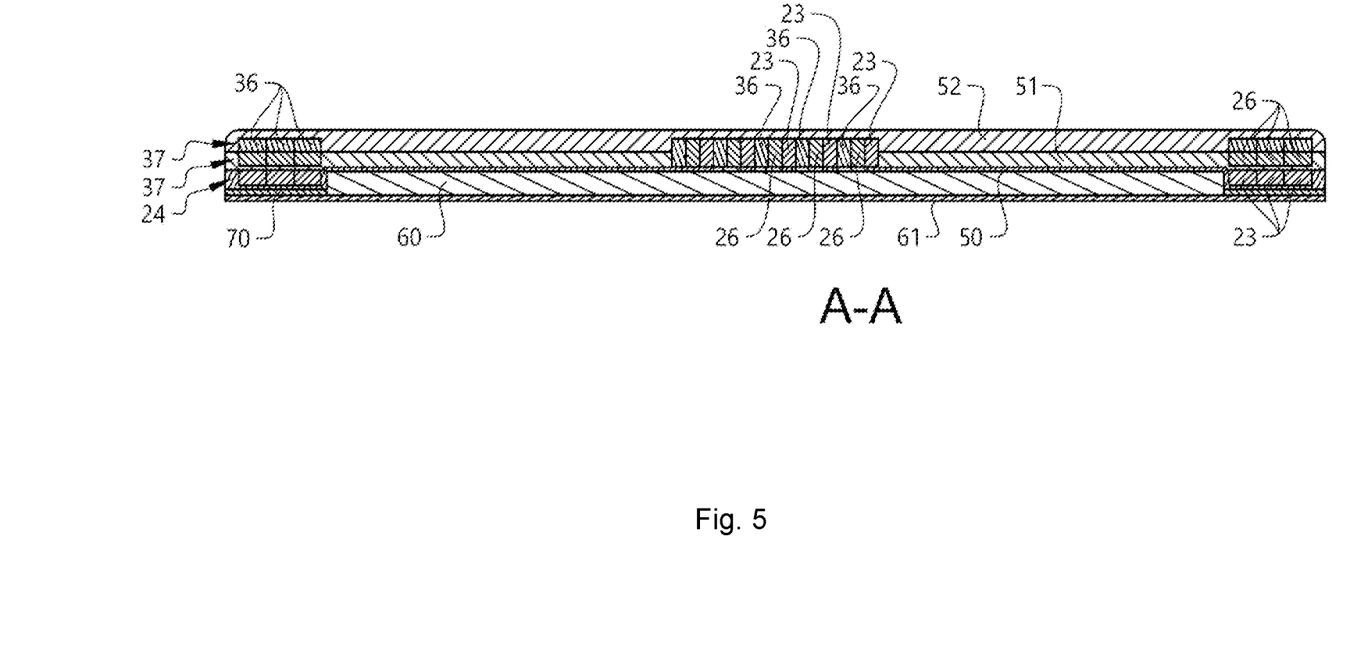
FIG. 5 is a cross-sectional view of the device taken along A-A in FIG. 2.
Figure 6A:
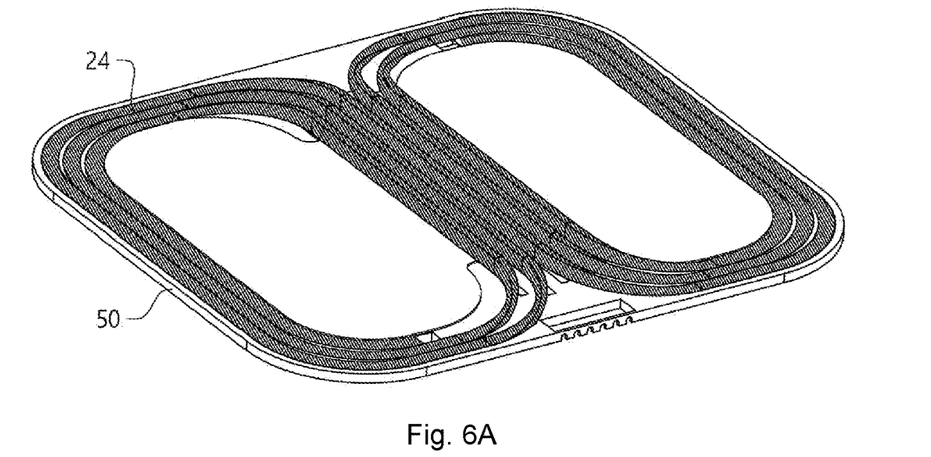
FIG. 6A is a perspective view of one embodiment of a first holder with a first sub coil.
Figure 6B:
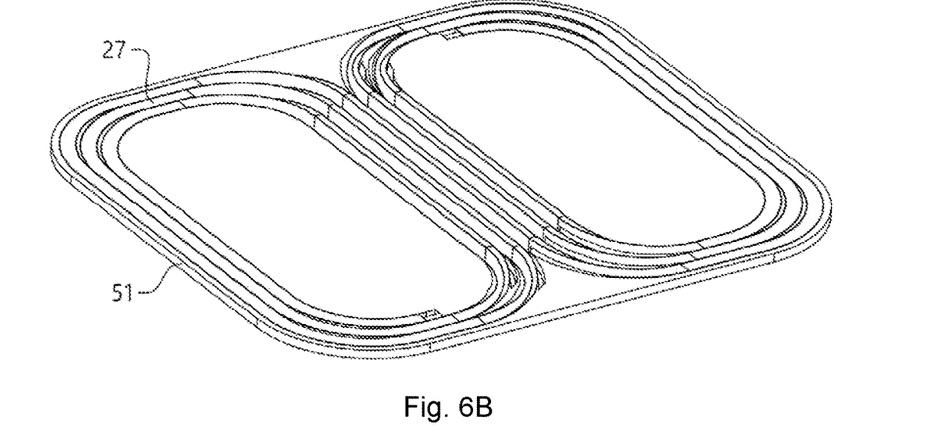
FIG. 6B is a perspective view of one embodiment of a second holder with a second sub coil.
Figure 6C:
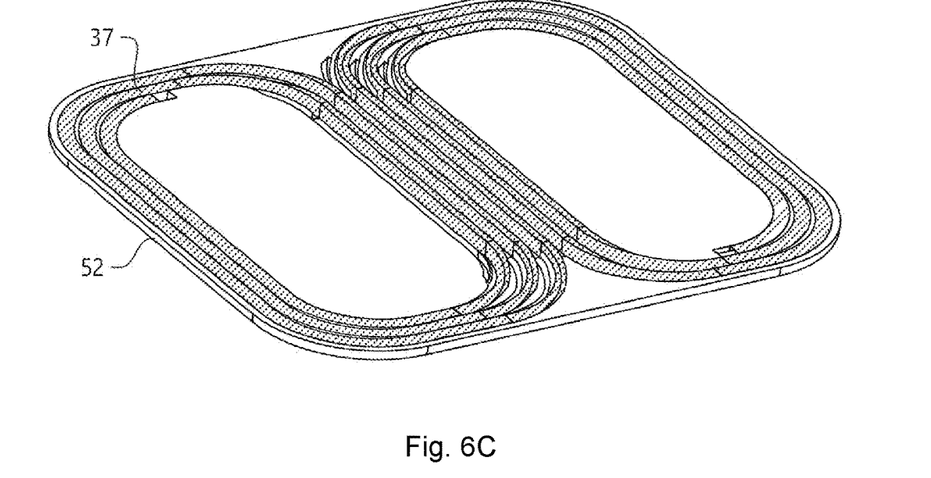
FIG. 6C is a perspective view of one embodiment of a third holder with a third sub coil.

With reference to FIGS. 6A, 6B and 6C, the device has been divided into parts for illustration purposes. The device 20 can comprise a first holder 50 for accommodating and holding the first sub coil 24, a second holder 51 for accommodating and holding the second sub coil 27 and a third holder 52 for accommodating and holding the third sub coil 37. The first holder, second holder and third holder are suitably configured to hold the first sub coil, second sub coil and third sub coil, respectively, in a predetermined winding pattern. As illustrated in FIGS. 2, 4A and 5, the first holder, the second holder and the third holder are arranged relative to each other such that the first, second and third sub coil together form the coil 22. (In FIG. 4A the holders are however omitted for illustration purposes.) The first, second and third holder can be arranged on top of each other and be mechanically connected to each other.

As already described hereinabove, in the first loop outer portion 32 and the second loop outer portion 33, the second sub coil 27 is arranged above, and preferably on top of the first sub coil 24 and the third sub coil 37 is arranged above, and preferably on top of the second sub coil 27, suitably in a direction substantially perpendicular to the main extension direction for the sub coils. The first holder, the second holder and the third holder can be connected to each other in a main connection direction substantially perpendicular to the main extension direction for the sub coils.

The housing 21 is suitably made from a non-conducting material, such as for example a plastic material. The first, second and third holder can be mechanically connected to each other by means of any suitable attaching mechanism, such as a bolted joint, a snap connection, a quick release connection, glue or similar.

The first holder 50 is preferably plate-shaped and has a main extension in a first plane, the second holder 51 is preferably plate-shaped and has a main extension in a second plane, and the third holder 52 is preferably plate-shaped and has a main extension in a third plane. The first holder, the second holder and the third holder are connected to each other such that the first plane, second plane and third plane are arranged substantially in parallel to each other. Further, the normal vectors to these planes are preferably in parallel to the main connection direction for connecting the holders to each other.

Figure 6D:
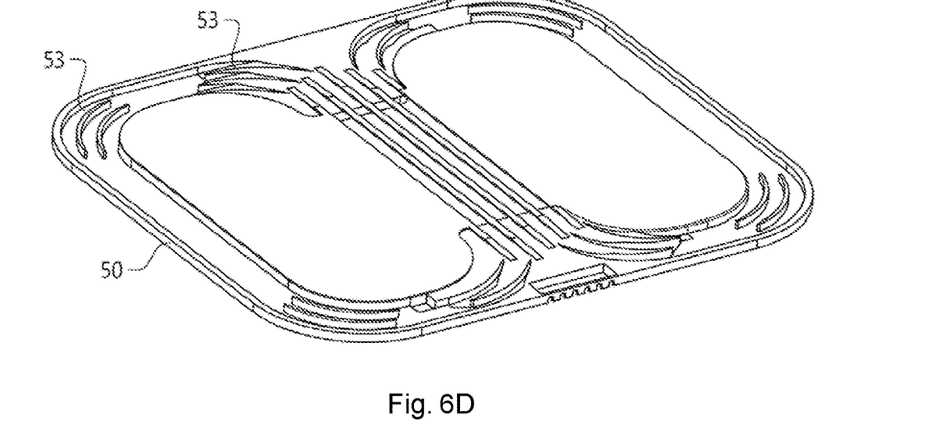
FIG. 6D is a perspective view of the first holder illustrated in FIG. 6A without the first sub coil.
Figure 6E:
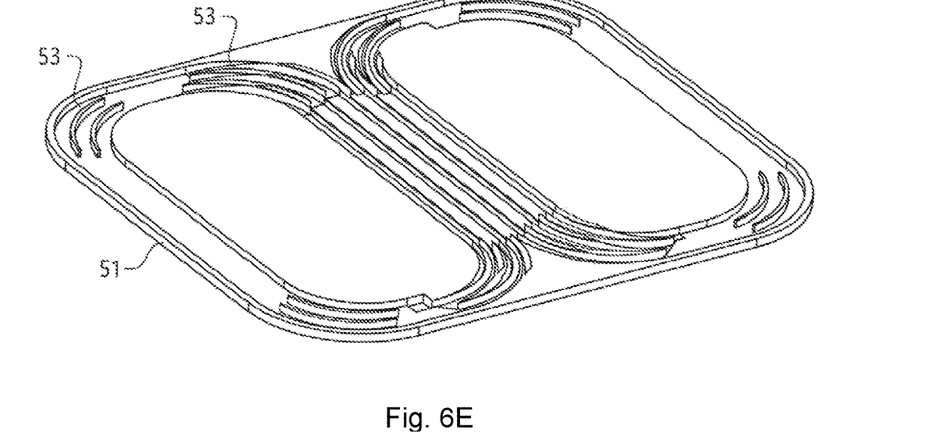
FIG. 6E is a perspective view of the second holder illustrated in FIG. 6B without the second sub coil.
Figure 6F:
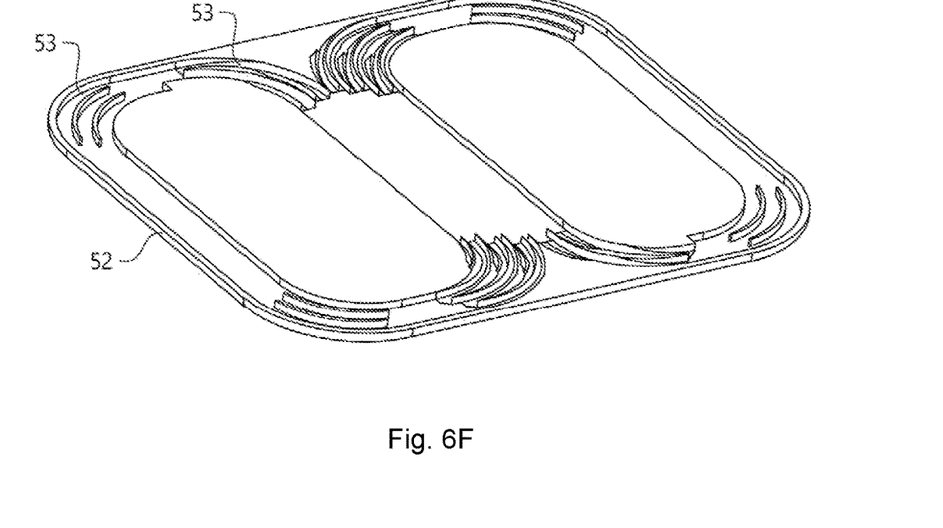
FIG. 6F is a perspective view of the third holder illustrated in FIG. 6C without the third sub coil.

The first holder 50, the second holder 51 and the third holder 52 are also illustrated in FIGS. 6D, 6E and 6F (without respective sub coil). The holders have guiding walls 53 or ribs for positioning of the respective sub coil and separating windings of the respective sub coil relative to each other. These guiding walls 53 can suitably be arranged where the extension direction of the respective conductor wire is changed. In other words; the guiding walls 53 can be arranged for guiding the respective conductor wire along at least a part of each of the windings or turns. In the example embodiment illustrated in FIGS. 6D, 6E and 6F, the guiding walls 53 are arranged at the corners of the housing 21 and in the twisting zones where the coil transitions between a state where the sub coils are arranged on top of each other and a state where the sub coils are arranged in the same plane. The guiding walls 53 are preferably curved for facilitating the positioning of the windings of the respective sub coil such that the extension direction of the windings can be changed and the windings can be kept in the desired position. The guiding walls 53 can have a height corresponding to the thickness (height) of the conductor wire. Further, the guiding walls can be relatively thin for avoiding unnecessary occupation of space and allow the windings to be arranged relatively close to each other. By means of the guiding walls each conductor wire can be wound more easily into the respective holder.

Figure 7A:
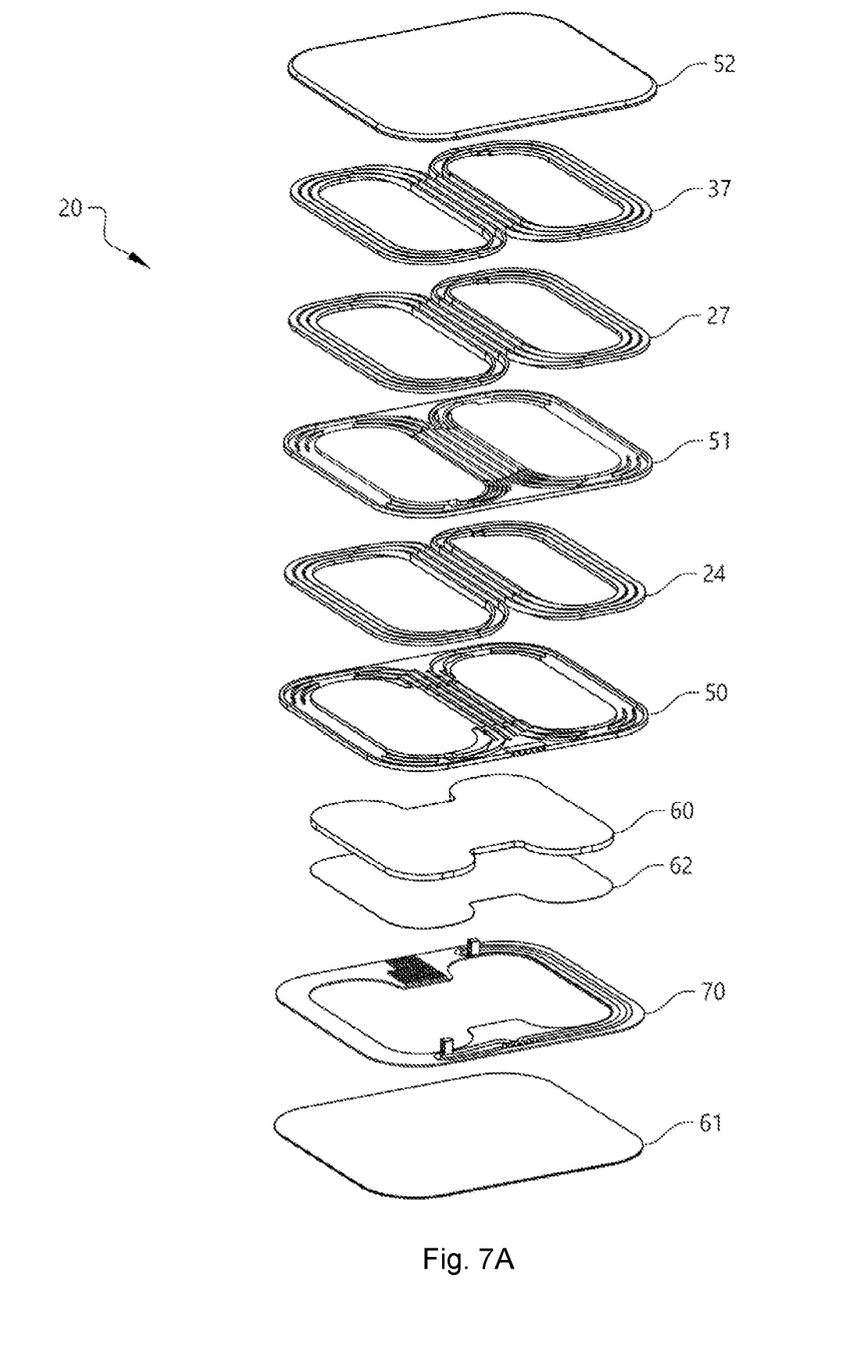
FIG. 7A is an exploded view of one embodiment of a device according to the invention.
Figure 8:
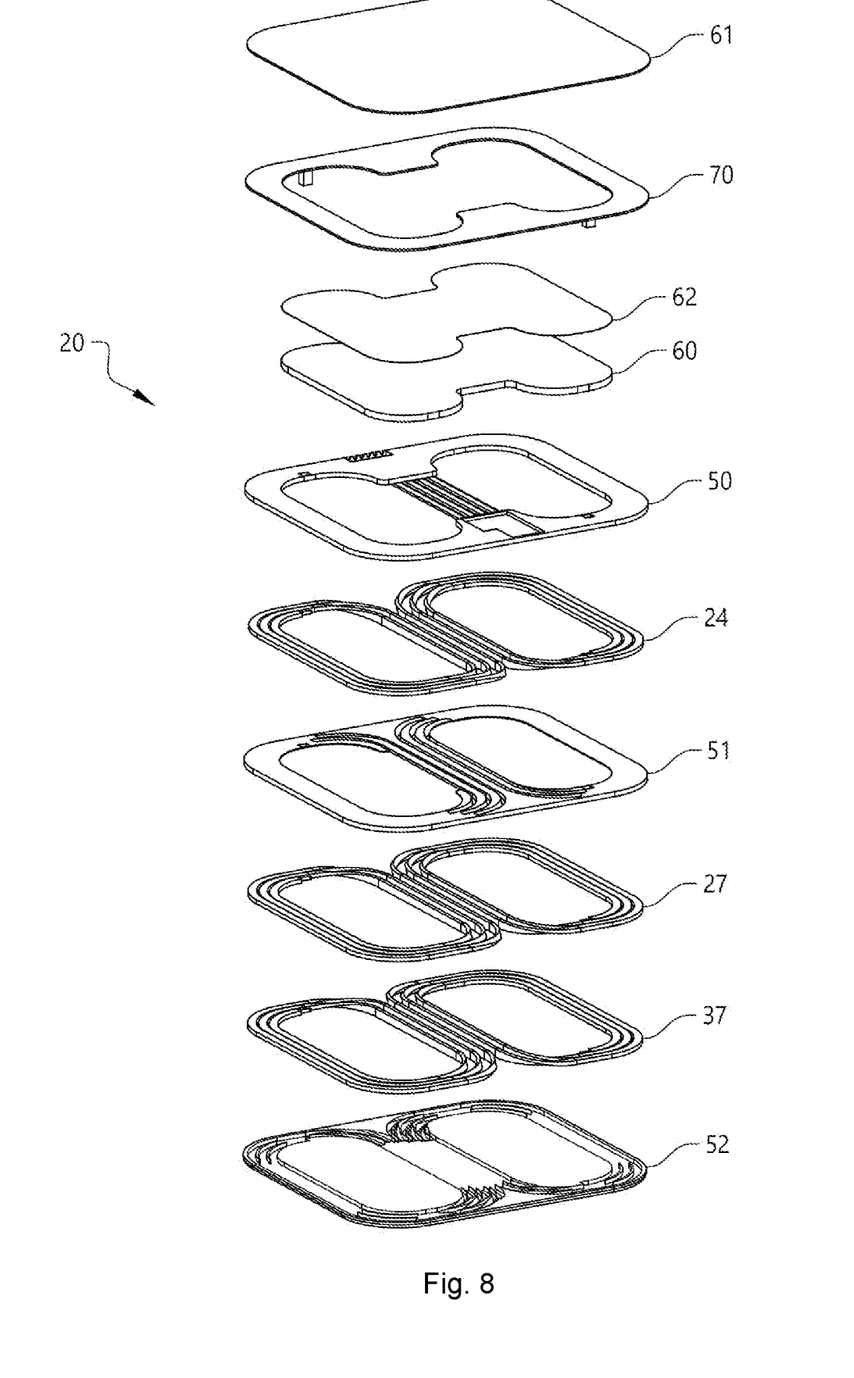
FIG. 8 is an exploded view of the device in FIG. 7A, where the device has been turned upside down as compared to FIG. 7A.

FIGS. 7A and 8 illustrate the device 20 in two exploded views. FIG. 7A shows the device 20 with the first holder 50 at the bottom, the second holder 51 above the first holder 50 and the third holder 52 above the second holder 51, whereas in FIG. 8 the device 20 is turned upside down in comparison to FIG. 7A, i.e. with the first holder 50 on the top.

As can be seen from FIGS. 7A and 8, and also from the cross-section view in FIG. 5, the device 20 comprises at least one ferrite plate 60 arranged next to the first holder 50. The number of ferrite plates and the design thereof can be varied. The first holder 50 is arranged to insulate the first sub coil 24 and said at least one ferrite plate 60 relative to each other. Optionally, the ferrite plate can be attached to the first holder by means of glue or double-sided tape or similar. Attachment of the ferrite plate will support the structure making it more robust which facilitates a subsequent winding of the conductor wire into the holder.

The device 20 further comprises a cover plate 61 arranged on outside of the first holder 50. The device 20 can further comprise an insulation plate 62 arranged between said at least one ferrite plate 60 and the cover plate 61 for insulating the ferrite plate 60 and the cover plate 61 relative to each other.

The example embodiments of the device illustrated herein, comprises a circuit card 70. The circuit card 70 illustrated in FIGS. 9 and 10 has electric contact points 71 for connecting the ends of the conductor wires, electric contacts 72 arranged at a connection position 76 provided for external electrical connection of the coil 22, and circuits 73 extending from the electric contact points 71 to the electric contacts 72. The circuit card can for example be a PCB (Printed Circuit Board).

As described hereinabove that the first, second and third holder can be mechanically connected to each other, also the circuit card 70 can be mechanically connected to one of the holders.

Figure 9:
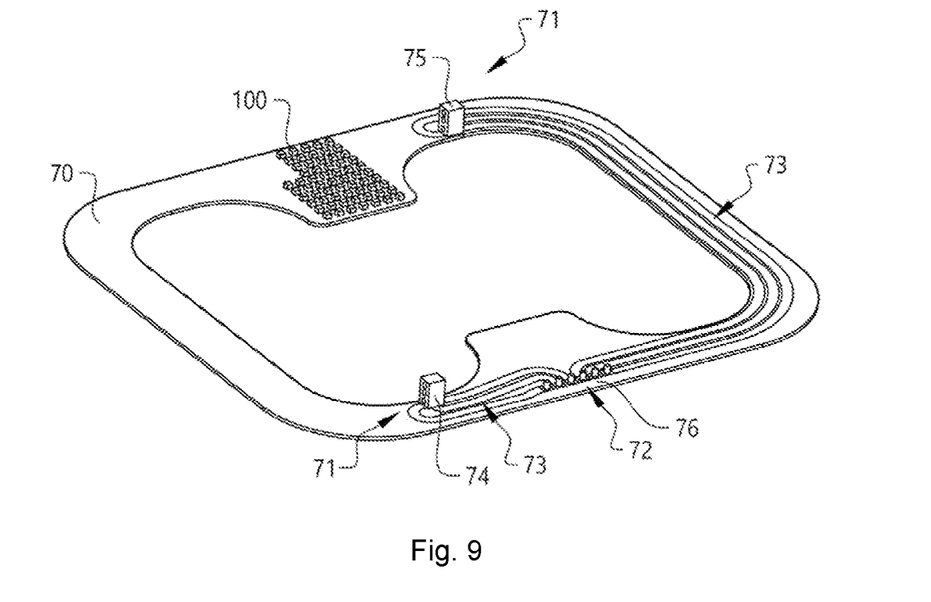
FIG. 9 is a perspective view of a circuit card of one embodiment of the device according to the invention.
Figure 10:
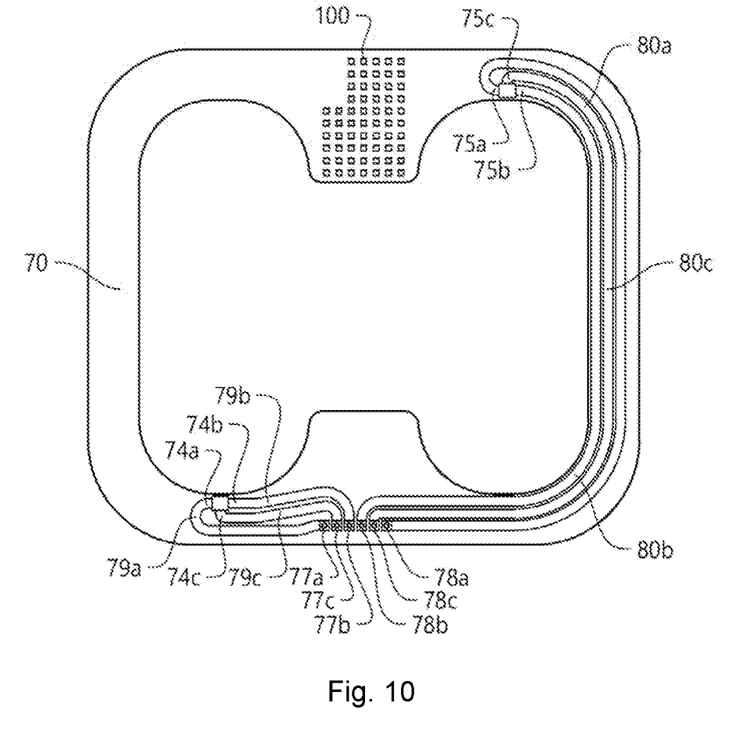
FIG. 10 is a top view of the circuit card in FIG. 9.

The number of electric contact points 71 and electric contacts 72 and corresponding circuits 73 of the circuit card 70 is of course adapted to the number of conductor wires of the device. In FIGS. 9 and 10, the circuit card 70 is adapted to a device comprises three conductor wires for forming three sub coils.

As already described, the coil 22 of the device has a first loop 29 and a second loop 30. The electric contact points 71 can comprise for each of the conductor wires a contact point 74 for a first end of the conductor wire and a contact point 75 for a second end of the conductor wire. The first end contact point 74 is arranged at the first loop 29 and the second end contact point 75 is arranged at the second loop 30. See also FIG. 4A. The first end contact point 74 is suitably arranged at the inside of the first loop 29 of the coil, and said second end contact point 75 is suitably arranged at the inside of the second loop 30 of the coil.

As illustrated in FIG. 10, the device can have a first end contact point 74a for the first conductor wire 23 and a second end contact point 75a for the first conductor wire 23, a first electric contact 77a and a second electric contact 78a, and a circuit 79a extending from the first end contact point 74a to the first electric contact 77a and a circuit 80a extending from the second end contact point 75a to the second electric contact 78a. In the same way, electric contact points 74b, 75b, 74c, 75c and electric contacts 77b, 77c, 78b, 78c and circuits 79b, 79c, 80b, 80c are arranged for the second and third conductor wires.

The extensions of the circuits of the circuit card are suitably within areas where the windings of the conductor wires are arranged, and preferably the circuits follow approximately to the extensions of the conductor wires, though in another plane. Hereby, any circuit extending in the open areas or "windows" inside of the loops of the coil is avoided to the greatest extent possible.

In the embodiment example illustrated in FIG. 2, the electric contact points and electric contacts for a third conductor wire are omitted since the coil has only two sub coils. Thus, the circuit card is adapted accordingly.

Further, the connection position 76 is preferably arranged outside of the first loop 29 and the second loop 30 in an area 90 between the first loop 29 and the second loop 30.

In addition, as schematically indicated in FIGS. 9 and 10, the circuit card can be used also for other components 100, such a capacitors and other electric components usable in a device for wireless power transfer.

Figure 7B:
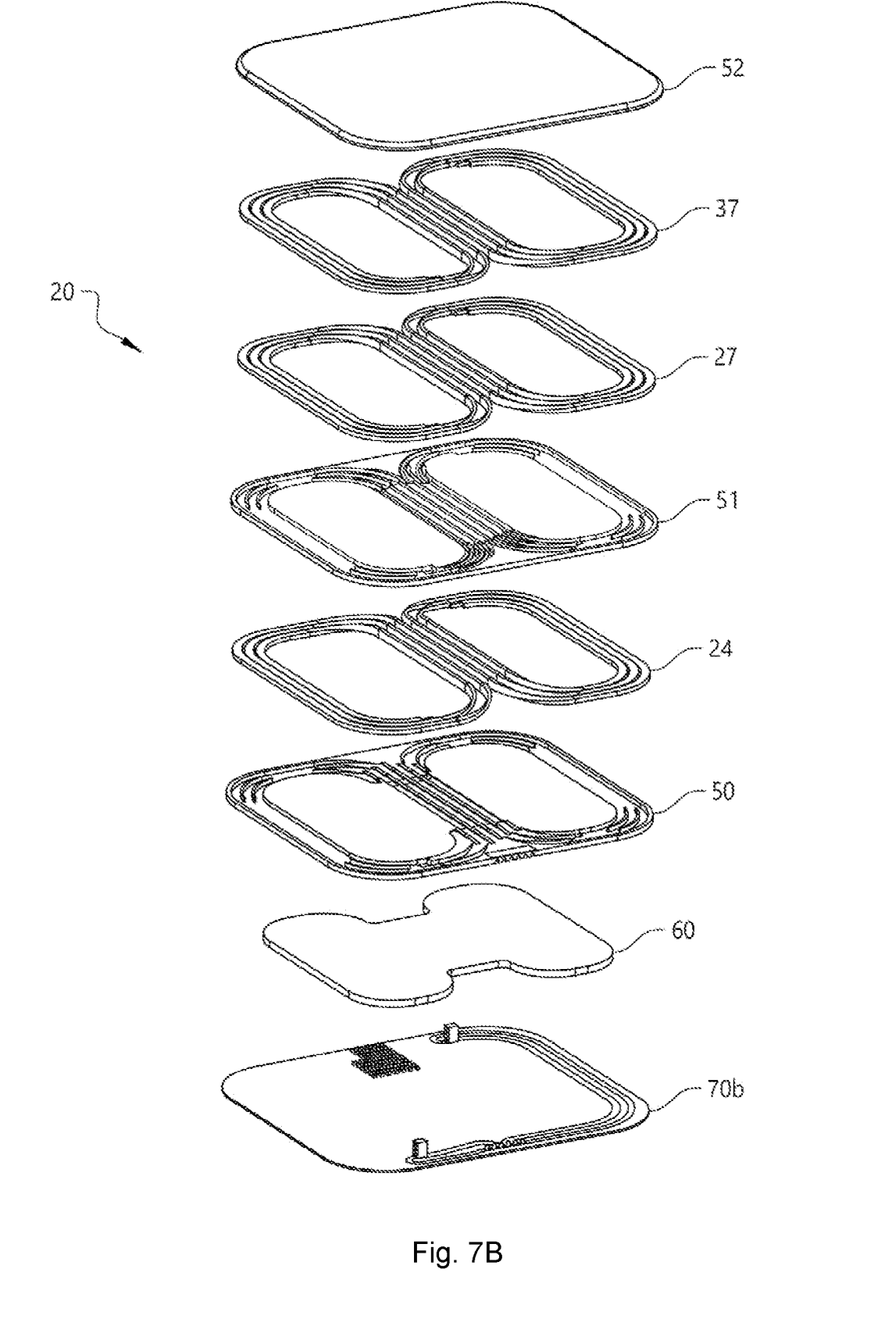
FIG. 7B is an exploded view of a variant of the embodiment illustrated in FIG. 7A.

In a further example embodiment illustrated in FIG. 7B, the device has a housing 21 enclosing the coil 22 wherein the circuit card 70b constitutes a part of the housing, preferably a major part of the housing. Such as a front or back plate. Hereby, a separate cover plate as well as an insulation plate can be dispensed with, since the circuit card 70b can constitute the back plate of the device as illustrated in FIG. 7B. Such a device can have one, two, three or more conductor wires, each forming a sub coil. The combination of contact points provided by the circuit card and the use of the circuit card as part of the housing, makes it possible to reduce the size of the device.

It is to be understood that the present invention is not limited to the embodiments described above and illustrated in the drawings; rather, the skilled person will recognize that many changes and modifications may be made within the scope of the appended claims.

What is claimed is:

1. A device for a wireless power transfer system for a vehicle, the device comprising a coil formed by at least a first conductor wire forming a first sub coil with a plurality of windings and a second conductor wire forming a second sub coil with a plurality of windings, the coil having a first loop and a second loop positioned next to each other, the first and second loop having a central portion of the coil in common where said at least first and second conductor wires extend from the first loop to the second loop and from the second loop to the first loop, said at least first and second conductor wires being arranged next to each other in the central portion, said at least first and second conductor wires being arranged above each other in an outer portion of the first loop and in an outer portion of the second loop, each of said at least first and second conductor wires being twisted around its own longitudinal axis at a position between the central portion and the first loop outer portion and at a position between the central portion and the second loop outer portion, said at least first and second conductor wires being twisted in the same rotation direction such that a lateral surface of the second conductor wire facing away from a corresponding surface of the first conductor wire next to the second conductor wire in the central portion, constitutes a top surface of the second conductor wire in the first loop outer portion and the second loop outer portion, and a lateral surface of the first conductor wire facing away from a corresponding surface of the second conductor wire next to the first conductor wire in the central portion, constitutes a bottom surface of the first conductor wire in the first loop outer portion and the second loop outer portion, and the second conductor wire being arranged above the first conductor wire in the first loop outer portion and the second loop outer portion.

2. A device according to claim 1, wherein the device comprises a first holder for accommodating and holding the first sub coil and a second holder for accommodating and holding the second sub coil, the first holder and the second holder being arranged relative to each other such that the first sub coil and the second sub coil together form the coil.

3. A device according to claim 2, wherein the first sub coil is wound into the first holder and the second sub coil is wound into the second holder.

4. A device according to claim 1, wherein the coil has a third conductor wire forming a third sub coil with a plurality of windings, said third conductor wire being arranged next to the second conductor wire in the central portion, said third conductor wire being twisted such that a lateral surface of the third conductor wire facing away from a corresponding surface of the second conductor wire next to the third conductor wire in the central portion, constitutes a top surface of the third conductor wire in the first loop outer portion and the second loop outer portion, and the third conductor wire being arranged above the second conductor wire in the first loop outer portion and the second loop outer portion.

5. A device according to claim 4, wherein the device comprises a first holder for accommodating and holding the first sub coil, a second holder for accommodating and holding the second sub coil, and a third holder for accommodating and holding the third sub coil, the first, second and third holder being arranged relative to each other such that the first, second and third sub coil together form the coil.

6. A device according to claim 5, wherein the third sub coil is wound into the third holder.

7. A device according to claim 1, wherein the device comprises a circuit card having electric contact points for connecting to the ends of the at least first conductor wire and the second conductor wire, electric contacts at a connection position provided for external electrical connection of the coil and circuits extending from the electric contact points to the electric contacts.

8. A device according to claim 7, wherein the electric contact points comprise for each of the at least first conductor wire and the second conductor wire a first end contact point for a first end of the respective conductor wire and a second end contact point for a second end of the respective conductor wire, the first end contact point being arranged at the first loop outer portion and the second end contact point being arranged at the second loop outer portion.

9. A device according to claim 8, wherein for the electric contact points for each of the at least first conductor wire and the second conductor wire, the first end contact point is arranged at the inside of the first loop, and the second end contact point is arranged at the inside of the second loop.

10. A device according to claim 8, wherein the connection position is arranged outside of the first loop and the second loop in an area between the first loop and the second loop.

11. A device according to claim 8, wherein the device has a housing enclosing the coil, the circuit card constituting a part of the housing.

12. A device according to claim 7, wherein the connection position is arranged outside of the first loop and the second loop in an area between the first loop and the second loop.

13. A device according to claim 7, wherein the device has a housing enclosing the coil, the circuit card constituting a part of the housing.

14. A device according to claim 13, wherein the circuit card constitutes a front plate or a back plate of the housing, the circuit card configured to reduce an overall thickness of the device by eliminating a need for a cover plate or an insulation plate.

15. A device according to claim 1, wherein the coil is designed with a double D-configuration, the first loop constituting a first D-shaped loop and the second loop constituting a second D-shaped loop of the double D-configuration.

16. A device according to claim 1, wherein the sub coils are arranged to be electrically connected in parallel.

17. A receiver for a wireless power transfer system, wherein the receiver comprises a device according to claim 1.

18. A vehicle comprising a device according to claim 1.

* * * * *